(12) United States Patent　　　(10) Patent No.:　US 12,667,887 B2
Blomqvist et al.　　　　　　　　　(45) Date of Patent:　　Jun. 30, 2026

---

(54) CUTTING TOOL

(71) Applicant: AB SANDVIK COROMANT, Sandviken (SE)

(72) Inventors: Andreas Blomqvist, Stockholm (SE); Jose Luis Garcia, Stockholm (SE); Erik Holmstrom, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 844 days.

(21) Appl. No.: 17/786,712

(22) PCT Filed: Dec. 17, 2020

(86) PCT No.: PCT/EP2020/086723
§ 371 (c)(1),
(2) Date: Jun. 17, 2022

(87) PCT Pub. No.: WO2021/122960
PCT Pub. Date: Jun. 24, 2021

(65) Prior Publication Data
US 2023/0037096 A1　　　Feb. 2, 2023

(30) Foreign Application Priority Data

Dec. 20, 2019　　(EP) .................................... 19218954

(51) Int. Cl.
　B22F 7/08　　　　　(2006.01)
　B22F 3/16　　　　　(2006.01)
　　　　(Continued)
(52) U.S. Cl.
　CPC ................ B22F 7/08 (2013.01); B23B 27/14 (2013.01); B23B 51/00 (2013.01); B23C 5/1009 (2013.01);
　　　　(Continued)

(58) Field of Classification Search
　CPC .................. B22F 7/08; B22F 2003/166; B22F 2005/001; B22F 2999/00; B23B 27/14;
　　　　(Continued)

(56) References Cited

U.S. PATENT DOCUMENTS 3,573,023　A　*　3/1971　Thomas et al. ....... C04B 41/009
　　　　　　　　　　　　　　　　　　　　65/61
5,447,549　A　　　9/1995　Yoshimura
　　　　(Continued)

FOREIGN PATENT DOCUMENTS

CN　　　　1268192　A　　9/2000
CN　　　　1295137　A　　5/2001
　　　　(Continued)

OTHER PUBLICATIONS

Correa et al. "Microstructure and mechanical properties of WC-Ai-Al based cemented carbide developed for engineering applications", International Journal of Materials Research, vol. 102, No. 11, p. 1369-1373, Nov. 2011 (Year: 2011).*

(Continued)

*Primary Examiner* — Danielle M. Carda
(74) *Attorney, Agent, or Firm* — Corinne R. Gorski

(57)　　　　　　　ABSTRACT

A cutting tool includes a substrate of cemented carbide including hard constituents in a metallic binder. The hard constituents includes WC and the WC content in the cemented carbide is 80-96 wt %. The cemented carbide has a Ni content of 2.5-13 wt %, a weight ratio of Fe/Ni<1.5 and a weight ratio of Co/Ni<0.825. The cutting tool includes a rake face, a flank face and a cutting edge there between, wherein the hardness H is measured with Vickers indentation and the crack resistance W is the ratio of the load to the total crack lengths of the cracks in the corners of said Vickers indentation. The product of the hardness at the rake face H(rake) and the crack resistance at the rake face (Continued)

W(rake) for the cutting tool is H(rake)*W(rake)>2000 HV100*N/μm.

16 Claims, 1 Drawing Sheet

(51) Int. Cl.
| | |
|---|---|
| *B22F 5/00* | (2006.01) |
| *B23B 27/14* | (2006.01) |
| *B23B 51/00* | (2006.01) |
| *B23C 5/10* | (2006.01) |
| *B24C 1/10* | (2006.01) |
| *B24C 11/00* | (2006.01) |
| *C22C 29/06* | (2006.01) |
| *C22C 29/08* | (2006.01) |

(52) U.S. Cl.
CPC ............... *B24C 1/10* (2013.01); *B24C 11/00* (2013.01); *C22C 29/067* (2013.01); *C22C 29/08* (2013.01); *B22F 2003/166* (2013.01); *B22F 2005/001* (2013.01); *B22F 2999/00* (2013.01)

(58) Field of Classification Search
CPC ......... B23B 51/00; B23C 5/1009; B24C 1/10; B24C 11/00; C22C 29/067; C22C 29/08
USPC ........................................................... 419/5
See application file for complete search history.

(56) References Cited

U.S. PATENT DOCUMENTS

| | | | |
|---|---|---|---|
| 2005/0120825 A1* | 6/2005 | Heinrich | ............... C23C 30/005 419/14 |
| 2007/0292672 A1 | 12/2007 | Ljungberg et al. | |
| 2018/0169766 A1* | 6/2018 | Yamamoto | ............. B23B 51/00 |

FOREIGN PATENT DOCUMENTS

| | | |
|---|---|---|
| CN | 102639267 A | 8/2012 |
| CN | 103160723 A | 6/2013 |
| CN | 105907997 A | 8/2016 |
| JP | 06-240303 | 8/1994 |
| JP | H07308859 A | 11/1995 |
| JP | H08302441 A | 11/1996 |
| WO | 02052054 A1 | 7/2002 |

OTHER PUBLICATIONS

Harada et al. "Effects of Fine Shot Peening on Surface Properties of High Speed Tool Steel". Domestic Magazine. Journal of the Japanese Society for Abrasive Machining, vol. 51, No. 3 issued 2007, pp. 30-35.

Wang et al. "Effect of shot peening on the residual stresses and microstructure of tungsten cemented carbide", Materials and Design 95, Jan. 22, 2016, pp. 159-164.

Edmilson et al: "Microstructure and mechanical properties of WC-Ni-Al based cemented carbides developed for engineering applications", International Journal of Materials Research, vol. 102, No. 11, Nov. 1, 2011, ppp. 1369-1373.

Zhang et al: "Sutdy on Microstructure and Mechanical Properties of WC-10Ni3Al Cemented Carbide Prepared by Different Ball-Milling Suspension", Materials, vol. 12, No. 14, Jul. 10, 2019, p. 2224.

Xiaoqiang Li et al. "Preparation and mechanical properties of WC-10Ni3Al cemented carbides with plate-like triangular prismatic WC grains", Journal of Alloys and Compounds, vol. 544, Aug. 4, 2012, pp. 134-140.

Rocha-Rangel. "Fracture Toughness Determinations by Means of Indentation Fracture". In: "Nanocomposites with Unique Properties and Applications in Medicine and Industry", Aug. 23, 2011, InTech, p. 31.

Faksa Lukas et al: "Effect of shot peening on residual stresses and crack closure in CVD coated hard metal cutting inserts", International Journal of Refractory Metals and Hard Materials, vol. 82, Apr. 16, 2019, pp. 174-182.

* cited by examiner

CUTTING TOOL

RELATED APPLICATION DATA

This application is a § 371 National Stage Application of PCT International Application No. PCT/EP2020/086723 filed Dec. 17, 2020 claiming priority to EP 19218954.6 filed Dec. 20, 2019.

TECHNICAL FIELD

The present invention relates to a cutting tool of cemented carbide wherein the cemented carbide comprises a metal binder and hard constituents comprising WC. The crack resistance of the surface area of the cutting tool is higher than the crack resistance in the bulk area of the tool.

BACKGROUND

Cutting tools for metal cutting applications commonly comprise a substrate of cemented carbide. Cemented carbide is a material that shows both high hardness and high toughness and the performance in cutting applications have been successful for decades. To further improve the performance of the cutting tool it is known to coat the tool with a wear resistant coating. It is also known to treat the cutting tool in a process called post treatment, including steps such as wet blasting, dry blasting, edge brushing and/or polishing. These post treatment processes typically change the surface roughness of the cutting tool and/or the residual stresses in the surface area of the cutting tool.

Effects of shot peening of cemented carbide is described by Wang et al., "Effect of shot peening on the residual stresses and microstructure of tungsten cemented carbide", Materials and Design 95, year 2016, pages 159-164. It is shown that compressive residual stresses are induced in the surface layer, both in the Co and in the WC.

There is a continuous need of improving the life times and performance of cutting tools to save time in production and reduce the risks of failure due to broken cutting tools. There is also a need to reduce the amount of Co in the cemented carbide, and to find alternative cemented carbides that can compete with the traditional Co-containing cemented carbide in metal cutting performance.

SUMMARY OF THE INVENTION

It is an object of the present invention to provide a cutting tool with improved resistance to wear in metal cutting applications and it is also an object to provide a method of making the same. It is a further object of the present invention to provide a cutting tool with high resistance to chipping of a coating at the cutting edge. Another object is to provide a turning tool with increased resistance to chipping of the cutting edge and/or breakage of the cutting tool.

At least one of these objects is achieved with a cutting tool according to claim 1 and a method according to claim 12. Preferred embodiments are listed in the dependent claims.

The present invention relates to a cutting tool comprising a substrate of cemented carbide, said cemented carbide comprises hard constituents in a metallic binder, the hard constituents comprise WC and the WC content in the cemented carbide is 80-96 wt %, and wherein the cemented carbide has a Ni content of 2.5-13 wt % and a weight ratio of Fe/Ni<1.5 and a weight ratio of Co/Ni<0.825, said cutting tool comprises a rake face, a flank face and a cutting edge there between, wherein the hardness H [HV100], is measured with Vickers indentation made with a load of 100*9.81 N, wherein the crack resistance W is defined as $$W = \frac{P}{4a}$$

wherein P is the load [N] of a Vickers hardness indentation and a is the average crack length [μm] of each crack formed at the corners of the Vickers hardness indentation, and wherein the product of the hardness at the rake face H(rake) and the crack resistance at the rake face W(rake) is H(rake)*W(rake)>2000 HV100*N/μm, preferably >3000 HV100*N/μm, more preferably >3500 HV100*N/μm.

Usually for most technical composite materials, such as cemented carbide materials, an increase in toughness is associated with a decrease in hardness. It has unexpectedly been found that by treating the material with the specific composition range described herein, crack resistance was increased without losing hardness. One way to express the combination of toughness and plastic deformation resistance (i.e. hardness) for cutting tool applications is by making the product of hardness H and crack resistance W, i.e. H*W. The higher the H*W, the more resistant to both crack formation and plastic deformation the cutting tool is. This high value of, H*W>2000 HV100*N/μm, preferably >3000 HV100*N/μm, more preferably >3500 HV100*N/μm, cannot be achieved by changing common material design variables such as grain particle size, volume fraction of phases, etc.

In one embodiment of the present invention the cemented carbide comprise x wt % Ni, y wt % Fe and z wt % Co and wherein 5<x+y+z<13. Cemented carbides within this range of binder content has a good combination of toughness and plastic deformation resistance that is suitable for metal cutting tool applications. Depending on the specific metal cutting application, the amount of binder can be optimized by a person skilled in the art.

In one embodiment of the present invention a relation between the hardness at the rake face of the cutting tool, H(rake), and the hardness at the flank face of the cutting tool, H(flank), is 0.9<H(rake)/H(flank)<1.1. On either of the surfaces, rake or flank, a high crack resistance can be achieved by lowering the hardness but this will however lower the plastic deformation resistance which will be detrimental to the cutting tool life time. A high hardness on both surfaces is advantageous for the wear resistance of the cutting tool.

In one embodiment of the present invention a relation between the hardness at the rake face of the cutting tool, H(rake), and the hardness at the bulk area of the cutting tool, H(bulk), is 0.9<H(rake)/H(bulk)<1.1. A high hardness in both the surface area of the cutting tool and in the bulk is advantageous for the wear resistance of the cutting tool in metal cutting applications.

In one embodiment of the present invention the crack resistance W as measured on the rake face of the cutting tool is W(rake), the W as measured on the flank face of the cutting tool is W(flank), and wherein W(rake)/W(flank)>2, preferably >2.5. Cracks that form during metal cutting usually originate on the rake side of the cutting tool, therefore a good crack resistance on the rake face is advantageous for metal cutting applications. Further, cutting tool production process will be relatively simple if only the rake face is to be shot peened, and the flank side is slightly less important.

In one embodiment of the present invention the crack resistance W as measured on the rake face of the cutting tool is W(rake) and the W as measured on the bulk area of the cutting tool is W(bulk) and wherein W(rake)/W(bulk)>2, preferably >2.5, more preferably >3. Cracks that form during metal cutting usually originate on the rake side of the cutting tool, therefore a good crack resistance on the rake face is advantageous for metal cutting applications. The cracks usually appear in the surface of the cutting tool and not in the bulk, so a high crack resistance in the surface area is advantageous.

In one embodiment of the present invention the hardness H(rake) on the rake face of the cutting tool is >1300 HV100, preferably >1400 HV100, more preferably >1500 HV100. A high hardness in the surface area of the cutting tool, especially in the area of the cutting tool that is in contact with the work piece material during metal cutting applications, is advantageous in that the wear resistance of the cemented carbide is increased. Further, a ceramic coating applied on the substrate can withstand longer on a harder substrate and thereby increase the life time of the cutting tool.

In one embodiment of the present invention the crack resistance on the rake face of the cutting tool is W(rake)>1.5 N/$\mu$m, preferably >2.0 N/$\mu$m, more preferably >2.2 N/$\mu$m. Cracks that form during metal cutting limits the lifetime of the cutting tool. Therefore, increasing the crack resistance on the rake face will prolong the tool life of cutting tools in metal cutting applications.

In one embodiment of the present invention the residual stress as measured in the surface area on the rake face of the cutting tool is compressive and >1500 MPa, preferably >2000 MPa, more preferably >2200 MPa, wherein the stress measurement is made with X-ray diffraction and the $\sin^2\psi$-method using the (2 1 1) reflection of WC. The compressive stress is preferably <3500 MPa, more preferably <3000 MPa. Compressive residual stresses inhibit the formation of cracks. Therefore, increasing the crack resistance on the rake face will prolong the tool life of cutting tools in metal cutting applications.

In one embodiment of the present invention the cemented carbide comprises 2.5-7 wt % Ni, 0.5-3 wt % Fe, 0.1-0.5 wt % Co, preferably the cemented carbide comprise 2.5-5.5 wt % Ni, 0.5-3 wt % Fe, 0.1-0.3 wt % Co and balance WC.

In one embodiment of the present invention the cemented carbide comprises one or more of Ti, Nb, Ta, Mo, Re, Ru, N, Cr, Zr, V, N, preferably the cemented carbide comprise 5-7 wt % Ni, 0.5-1.5 wt % Fe, 0.2-0.4 wt % Co and one or more of Ti, Nb, Ta, Mo, Re, Ru, Cr, Zr, V, N, more preferably the cemented carbide comprise 1.5-2.5 wt % Ti, 0.25-0.75 wt % Nb, 2.5-3.5 wt % Ta, 0.05-0.2 wt % N, 5-7 wt % Ni, 0.5-1.5 wt % Fe, 0.2-0.4 wt % Co and balance WC. This specific composition is optimal to form a surface zone depleted of cubic carbides which is advantageous for steel turning applications. A cutting tool with a surface zone depleted of cubic carbides has an increased resistance to crack growth while keeping a good bulk plastic deformation resistance.

The present invention also relates to a method of treating a cutting tool comprising a cemented carbide substrate, said cemented carbide comprises hard constituents in a metallic binder, the hard constituents comprise WC and the WC content in the cemented carbide is 80-96 wt % and wherein the cemented carbide has a Ni content of 2.5-13 wt % and a weight ratio of Fe/Ni<1.5 and a weight ratio of Co/Ni<0.825, wherein the cutting tool (1) comprises a rake face (2), a flank face (3) and a cutting edge there between, and wherein said shot peening is performed at least on the rake face (2), the method comprises a step of shot peening the rake face of the cutting tool. It has unexpectedly been found that shot peening on this specific cemented carbide composition increases the crack resistance of the surface while the hardness is maintained, thereby improving the combination of hardness and crack resistance.

In one embodiment of the present invention the shot peening is performed at a temperature of 100-600° C., preferably 200-550° C., more preferably 300-500° C. It has surprisingly been found that shot peening at this elevated temperature improves the properties of the specific cemented carbide to levels of crack resistance and/or residual stress levels that has not been reached earlier.

The shot peening of the present invention is in one embodiment performed at an elevated temperature, and this temperature is herein defined as the temperature that the material (the portion of the cutting tool) that is shot peened is at during the shot peening. Several methods can be used to create the elevated temperature of the cutting tool portion, such as induction heating, resistance heating, pre-heating on a hot surface/oven, laser heating etc. The cutting tool can alternatively be heated in a separate step prior to the shot peening step.

The temperature is suitably measured on the substrate by any method suitable for measuring temperature. Preferably, an infrared temperature measurement device is used.

The portion of the substrate that is subjected to shot peening is at said temperature. It has unexpectedly been found that treating a cutting tool with shot peening when it is heated increases its crack resistance in the surface area which is an important property for increasing the lifetime of a cutting tool.

In one embodiment of the present invention an edge rounding, ER, of at least a part of said cutting edge is between 10 $\mu$m and 50 $\mu$m, preferably between 20 $\mu$m and 40 $\mu$m. It has surprisingly been found that the cutting tools made according to present method is performing well on cutting tools with this ER.

In one embodiment of the present invention the shot peening is performed with ceramic beads, preferably with beads comprising $ZrO_2$, $SiO_2$ and $Al_2O_3$. Depending of the type of media a person skilled in the art can optimize the level of energy delivered to the cutting tool and thereby optimize the shot peening process.

In one embodiment of the present invention the shot peening is performed with beads of an average diameter of about 50-200 $\mu$m. If the beads are too large the risk of damaging the cutting edge is increased. If the beads are too small the energy and impact transferred from the media to the substrate is less pronounced. The impact or energy from the beads during the shot peening should not be too high since this would increase the risk of damaging the surface and the cutting edge of the cutting tool. The impact or energy from the beads should neither be too low since then the technical effect would not be achieved. A suitable size of the beads is related to the material of the beads and is to be selected by the skilled person.

DEFINITIONS

"Cemented carbide" is a material comprising hard constituents distributed in a continuous metallic binder or hard constituents forming a skeleton embedded in a continuous metallic binder. The hard constituents mainly comprise WC. This kind of material has properties combining a high hardness from the hard constituents with a high toughness from the metallic binder and is suitable as a substrate material for metal cutting tools.

By the "composition of" or "content in" the cemented carbide is herein meant the average composition or the average content in the cemented carbide substrate. For example a gradient in the surface zone, such as 15-30 μm from the surface of the substrate towards the bulk, with a locally higher metallic binder content does not change the average composition of the cemented carbide substrate of the cutting tool since the cutting tool is at least several mm in dimension.

The "metallic binder" of the cemented carbide can comprise elements that are dissolved in the metallic binder during sintering, such as W and C originating from the WC. Depending on what types of hard constituents that are present, also other elements can be dissolved in the binder. By "cutting tool" is herein meant a cutting tool for metal cutting applications such as an insert, an end mill or a drill. The application areas can be turning, milling or drilling.

"ER" is a value of the edge rounding intended to indicate the sharpness of the edge. Larger values of ER represent a rougher shape of the cutting edge while a smaller value of ER represent a sharp cutting edge.

ER is herein defined as a value as calculated according to the following:

put the cutting tool on a flat surface on its bearing surface or the corresponding surface of the cutting tool.

align a first plane along the side of the cutting tool perpendicular to said flat surface, in contact with the edge to measure, for example along the flank face 3 of the cutting tool 1, align a second plane in parallel with said flat surface and intersecting at an intersection point said first plane, said second plane being in contact with the edge to measure at a contact point, for example said second plane is aligned along the rake face 2 of the cutting tool 1.

Figure 1:
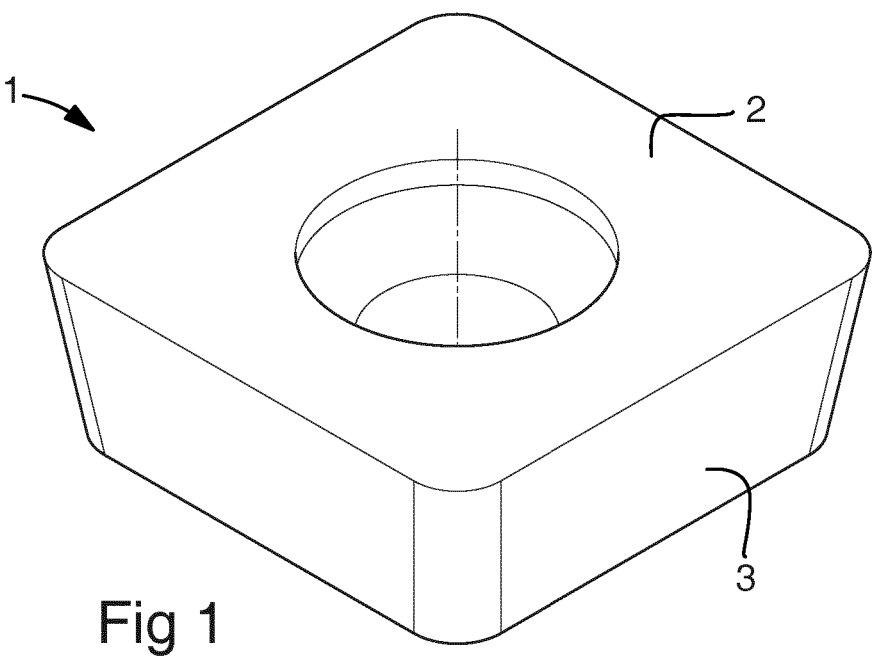
FIG. 1 is a general view of a cutting tool insert 1, provided with a rake face 2, a flank face 3 and cutting edge provided therebetween.
Figure 2:
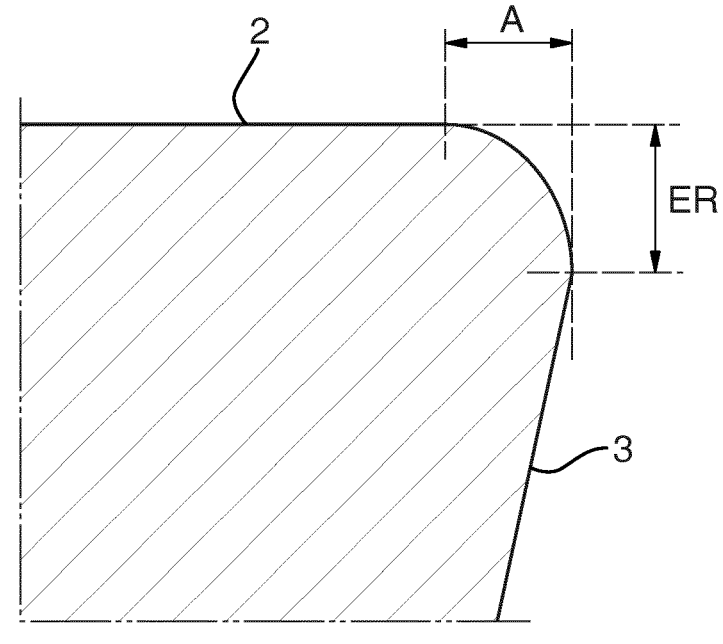
FIG. 2 is a general view of a cross section of a cutting edge wherein the edge rounding, ER, is indicated and also the width, A, of the cutting edge is shown schematically.

The value "ER" is equal to the distance between the intersection point between the first and the second plane and the point of contact between the first plane and the cutting tool, close to the edge, see FIG. 2.

"Shot blasting" is herein meant a process using abrasive grains wherein material typically is removed from the treated surface by abrasive wear. Shot blasting is well known in the field of cutting tools and is for example known to introduce residual stresses in a coating on a cutting tool.

By "shot peening" is herein meant that the surface of a cutting tool is bombarded with a media comprising particles, such as beads, that are non-abrasive and that typically have a round shape. The media can be beads of a hard material such as an oxide, steel or cemented carbide.

By the term "bulk" is herein meant the innermost part (centre) of the cutting tool.

By the term "surface area" is herein meant the outer portion of the substrate which is influenced by the shot peening process disclosed herein.

FURTHER EMBODIMENTS OF THE INVENTION

In one embodiment of the present invention the WC grain size is homogeneous through the whole substrate. Non-homogenous WC-grain size could lead to crack initiation sites due to difference in thermomechanical properties of different zones.

In one embodiment of the present invention the average WC grain size is 0.2-10 μm, preferably 0.5-3 μm. In this range the grain size of WC is optimal for cemented carbide aimed at metal cutting inserts. Depending on the metal cutting application, the WC grain size can be optimized by a person skilled in the art.

In one embodiment of the present invention, the cemented carbide further comprises a cubic phase, sometimes called gamma phase, which is a solid solution of cubic carbides and/or carbonitrides of one or more elements selected from Ti, Ta, Nb, Hf, Zr, V and Cr. The amount of cubic phase, in area % is suitably from 2 to 25%, preferably between 3 to 15%. This can be measured in different ways but one way is to perform an image analysis of either a Light Optical Microscope image or a Scanning Electron Microscope (SEM) micrograph of a cross section of the substrate to calculate the average fraction of gamma phase.

In one embodiment of the present invention, the cemented carbide comprises a cubic phase and a binder phase enriched surface zone depleted from cubic phase. The thickness of the surface zone is suitably from 2 to 100 μm, preferably from 3 to 70 μm and more preferably from 8 to 35 μm. The thickness is determined by measuring on a SEM or LOM image of a cross section of the substrate. Those measurements should be performed in areas where the substrate surface is reasonably flat, i.e. not close to the edge, at least 0.3 mm from the cutting edge, or nose etc. in order to get a true value. The boundary between the surface zone and the bulk is determined by the absence/presence of cubic phase which is usually quite distinct when observing a cross-section of the substrate in a SEM or LOM image. The thickness is determined by the distance between the surface and the boundary between the surface zone and the bulk. By binder enriched is herein meant that the binder phase content in the surface zone is suitably from 1.05 to 1.65 times, preferably from 1.1 to 1.5 times the binder phase content in the bulk. The binder phase content in the surface zone is suitably measured at a depth of half the total thickness/depth of the surface zone. All measurements performed on the bulk should be performed at an area not too close to the surface zone. By that is herein meant that any measurements done to the microstructure of the bulk should be performed at a depth of at least 200 μm from the surface.

By surface zone depleted of cubic phase is herein meant that the surface zone contains no, or very few cubic phase particles, i.e. less than 0.5 area %.

In one embodiment of the present invention the cutting tool is provided with a coating. The coating can be a colour layer or a wear resistant coating.

In one embodiment of the present invention the thickness of the coating is 2-20 μm, preferably 5-10 μm.

In one embodiment of the present invention the coating is a CVD coating or a PVD coating, preferably said coating comprising one or more layers selected from TIN, TiCN, TIC, TiAlN, $Al_2O_3$ and ZrCN. The coating is preferably a CVD coating comprising a TiCN layer and an $Al_2O_3$ layer.

In one embodiment of the present invention, the coating is a CVD coating comprising an inner TiCN layer and an outer $\alpha$-$Al_2O_3$ layer.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In one embodiment of the present invention the cutting tool comprises a rake face, a flank face and a cutting edge there between, and wherein said shot peening is performed at least on the rake face. Rake face peening is advantageous in that it is at the rake face that the working material hits the cutting tool during the cutting operation and that the mechanisms during peening that is influencing the substrate is therefore applied at a relevant area or volume of the substrate. It is further advantageous to apply the shot peening at the rake face since for many cutting tool geometries this imply treating several cutting edges at the same time.

In one embodiment of the present invention the shot peening is performed on heated cutting tools, the method comprises a step prior to the shot peening wherein said cutting tools are heated.

In one embodiment of the present invention the method further comprises a step of shot blasting at least a portion of the cutting tool. Preferably the portion includes at least a section of the cutting edge or an area close to the cutting edge.

In one embodiment of the present invention the step of shot blasting is performed subsequent to the shot peening. The heat during the shot peening can reduce some positive effect from the shot blasting, such as residual stress induction in a coating, so by choosing to do the shot peening before the shot blasting both positive effects can be maintained.

In one embodiment of the present invention the shot blasting and the shot peening are performed on the same portions of the cutting tool. This is advantageous for example during a production in large scale due to a more effective loading of the cutting tools.

In one embodiment of the present invention the shot peening is performed in a shot direction that is perpendicular to the surface of the cutting tool. A perpendicular shot peening is advantageous in that the depth of the impacted substrate is the largest when the heated shot peening is in this direction.

In one embodiment of the present invention, the cutting tool 1 is an insert, preferably a milling insert or a turning insert.

The shot peening process according to the present invention can also be combined with other process steps known in the art of making cutting tools such e.g. brushing, polishing, wet blasting, dry blasting etc.

EXAMPLES

Exemplifying embodiments of the present invention will now be disclosed in more detail and compared to reference embodiments. Both coated and uncoated cutting tools (inserts) were prepared and analyzed.

Example 1 (Sample Preparations)

Cutting tools of cemented carbide were prepared by forming substrates from raw materials to reach a raw material composition according to Table 1. Fe and Ni was added as metallic ($Ni_{0.85}$, $Fe_{0.15}$) and Fe. Ta and Nb was added as TaC and ($Ta_{0.6}$, $Nb_{0.4}$)C. Ti and N was added as ($Ti_{0.5}$, $W_{0.5}$)C and $Ti(C_{0.5}, N_{0.5})$. C to compensate for carbon lost during milling and sintering was added as carbon black. The WC was added as raw material "WC-1" or "WC-2". The average particle size (FSSS) for WC-1 was 1.24-1.44 μm and for WC-2 was 5.5-6.3 μm. The amount of each raw material was adapted and is presented based on the total dry powder weight where the balance is WC. The substrates were manufactured according to conventional methods including milling, spray drying, pressing and sintering. Cutting tools of the Insert type CNMG120408-PM were formed. The relative content of for example Ni, Fe, Co and also WC is preserved from the raw material dry powder to the sintered cemented carbide.

TABLE 1

| | | Raw material compositions for substrates (wt % of total dry powder weight) | | | | | | | |
| Sub-strate | WC raw material | Ni | Fe | Co | Ti | Ta | Nb | N | WC |
| --- | --- | --- | --- | --- | --- | --- | --- | --- | --- |
| 1 | WC-1 | 4.89 | 0.83 | 0.23 | — | — | — | — | Bal-ance |
| 2 | WC-1 | 2.98 | 2.78 | 0.23 | — | — | — | — | Bal-ance |
| 3 | WC-2 | 6.5 | 1.08 | 0.30 | 1.83 | 2.72 | 0.44 | 0.09 | Bal-ance |

During the sintering of substrate 3, a cubic carbide free zone of about 20 μm was formed in the surface zone of the substrates.

Substrates 3 were coated in a CVD coating process, depositing the layers TIN/TiCN/$\alpha$-$Al_2O_3$/TiN. The total coating thickness was about 14 μm. The thickness of the lower TIN and the TiCN is about 9 μm in total.

The cutting tools of all the types of substrates were subjected to shot peening at room temperature of 25° C. and the elevated temperature of 500° C. forming samples Comparative 1-3 and Invention 1-3.

The shot peening of the samples was performed in an AUER Manual Blasting Cabinet ST 700 PS equipment. A blasting media of ceramic beads with a spherical shape and an average diameter of about 100 μm was used, media Microblast® B120. The grain size of the ceramic beads was 63-125 μm. The ceramic beads has a composition of 60-70% $ZrO_2$, 28-33% $SiO_2$ and <10% $Al_2O_3$. The shot gun pressure was set to 5 bar, the working time was set to 20 seconds, the nozzle diameter was 8 mm and the stand-off distance was 100 mm. The peening was applied perpendicular to the rake face of the cutting tools. In the case of heated shot peening the cutting tools were heated with an induction coil heater prior to the shot peening and the temperature of the cutting tools were measured with a temperature sensor. The induction heater was a Rimac induction heater, 1.5 kW.

The cutting edges of the of the cutting tools after these post-treatments were about ER 40 μm.

Vickers Measurements

Vickers indentations were made on rake faces of the cutting tools and on cross sections of the cutting tools. Vickers indentations can also be made at the flank faces.

The uncoated samples were gently polished to achieve a suitable surface for crack length measurements. The samples were either polished using 0.25 μm diamond paste on paper and polished by hand or using 0.25 μm diamond paste on a 20 mm diameter felt wheel using a Gatan Inc. Dimple Grinder model 656 with medium speed and 35 g load. The polishing was conducted until a surface revealing enough polished areas for subsequent crack length measurements was achieved.

The coated samples were polished using standard methods so that the TiCN layer was exposed on the rake face of the cutting tool. A bulk sample was prepared by cutting the insert perpendicular to the rake face using a diamond wheel and subsequently polishing using 9 μm diamond dispersed in oil on paper and then 1 μm diamond dispersed in oil.

The Vickers hardness of the polished samples were measured using a programmable hardness tester, KB30S by KB Prüftechnik GmbH. The measurements were calibrated against HV100 using test blocks issued by Euro Products Calibration Laboratory, UK. Vickers hardness was measured according to ISO EN6507.

Vickers hardness measurements were performed by programming the hardness tester to perform indentations at certain positions. Indentations are then performed using the specified load. At least two parallel HV100 indentations were made with a distance from each others of at least 1.5 mm and the presented result is an average value.

The lengths of the cracks at each corner of the Vickers intents were analysed and measured in Olympus BX51M light optical microscopes with a camera and computer. The specimen and camera were oriented so that the diagonals of the Vickers indents were horizontal and vertical on the computer screen. A magnification of at least 100 times was used. If the tip of the crack was difficult to find, a higher magnification was applied to locate the tip of the crack before measurement. The two diagonals of each indent were measured, and the cracks were measured as the projection onto extended diagonals of the indents from respective indent corner to the crack tip.

Residual Stress Measurements

X-ray diffraction was used to determine residual stresses in the aforementioned samples through the so-called $\sin^2\psi$-method. In this method the shift of lattice spacings d (and hence the strains) are measured as a function of sample tilt angles $\psi$. The residual stresses are obtained from the linear slope of the strain vs $\sin^2\psi$ curve. Residual stresses are converted from strain values by using X-ray elastic constants.

The XRD measurements were performed on a Bruker Discover D8 diffractometer with Davinci design equipped with a I μS Microfocus Source (CuK$_a$ radiation, $\lambda$=1.5418 Å), a Våntec-500 area detector and an ¼ Eulerian cradle. The (2 1 1) reflection of WC located at 117.32° 2θ was used for strain measurements. The residual stress measurements were performed in 1 to 4 angular directions, φ: 0°, 90°, 180°, 270° and for each q-direction 10 equidistant $\psi$-angles (0°-50°) were measured, measurement time 400 s. A collimator with 1.0 mm diameter was used in all measurements.

The resulting residual stresses were obtained from strain data by using X-ray elastic constants for WC, Bragg peak (2 1 1). The X-ray elastic constants where calculated from Poisson's ratio v=0.191 and Young's modulus=717.360 GPa.

The samples were mounted with adhesive tape to the sample holder.

The XRD data were analyzed with software DIFFRAC EVA (Bruker) and High Score Plus (Malvern Panalytical). Software LEPTOS 7 (Bruker) was used in the residual stress analysis.

TABLE 3

Summary of residual stress results

| Name of sample | Shot peening | Residual stress in surface area [MPa] |
|---|---|---|
| Invention 1 | at 500° C. | −2230 |
| Invention 1B | at 25° C. | −1971 |
| Reference 1 | no peening | −245 |
| Invention 2 | at 500° C. | −2726 |

TABLE 2

Summary of hardness and crack lengths HV100 results

| Sample | Shot peening | H(rake) [HV100] | H(bulk) [HV100] | Mean crack length (rake) [μm] | Mean crack length (bulk) [μm] | W(rake) [N/μm] | W(bulk) [N/μm] | H * W (rake) [HV100 *N/μm] |
|---|---|---|---|---|---|---|---|---|
| Invention 1 | 500° C. | 1570 | 1516 | 101 | 311 | 2.42 | 0.79 | 3803 |
| Comparative 1 | 25° C. | 1541 | | 166 | | 1.48 | | 2277 |
| Reference 1 | no | 1533 | | 247 | | 0.99 | | 1521 |
| Invention 2 | 500° C. | 1588 | 1585 | 101 | 341 | 2.43 | 0.72 | 3866 |
| Comparative 2 | 25° C. | 1568 | | 181 | | 1.35 | | 2122 |
| Reference 2 | no | 1566 | | 367 | | 0.67 | | 1046 |
| Invention 3 | 500° C. | 1426 | 1325 | 65 | 204 | 3.76 | 1.20 | 5360 |
| Comparative 3 | 25° C. | 1426 | | 125 | | 3.52 | | 2803 |
| Reference 3 | no | 1370 | | 248 | | 1.35 | | 1356 |

11

TABLE 3-continued

Summary of residual stress results

| Name of sample | Shot peening | Residual stress in surface area [MPa] |
|---|---|---|
| Invention 2B | at 25° C. | −2019 |
| Reference 2 | no peening | −219 |

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A cutting tool comprising:
a substrate of cemented carbide, said cemented carbide including hard constituents in a metallic binder, the hard constituents including WC and the WC content in the cemented carbide being 80-96 wt %, and wherein the cemented carbide has a Ni content of 2.5-13 wt % and a weight ratio of Fe/Ni<1.5 and a weight ratio of Co/Ni<0.825; and
a rake face, a flank face and a cutting edge there between, wherein the hardness H, is measured with Vickers indentation made with a load of 100*9.81 N, wherein the crack resistance W is defined as $$W = \frac{P}{4\bar{a}}$$

wherein P is the load of a Vickers hardness indentation and a is the average crack length of each crack formed at the corners of the Vickers hardness indentation, and wherein the product of the hardness at the rake face H(rake) and the crack resistance at the rake face W(rake) is H(rake)*W(rake)>3000 HV100*N/μm, wherein the W as measured on the bulk area of the cutting tool is W(bulk) and wherein W(rake)/W(bulk)>2.

2. The cutting tool of claim 1, wherein the cemented carbide includes x wt % Ni, y wt % Fe and z wt % Co and wherein 5<x+y+z<13.

3. The cutting tool of claim 1, wherein a relation between the hardness at the rake face of the cutting tool, H(rake) and the hardness at the flank face of the cutting tool, H(flank) is 0.9<H(rake)/H(flank)<1.1.

4. The cutting tool of claim 1, wherein a relation between the hardness at the rake face of the cutting tool, H(rake) and the hardness at the bulk area of the cutting tool, H(bulk) is 0.9<H(rake)/H(bulk)<1.1.

5. The coated cutting tool of claim 1, wherein the crack resistance W as measured on the rake face of the cutting tool is W(rake), the W as measured on the flank face of the cutting tool is W(flank), and wherein W(rake)/W(flank)>2.

6. The cutting tool of claim 1, wherein the hardness H(rake) on the rake face of the cutting tool is >1300 HV100.

7. The cutting tool of claim 1, wherein the crack resistance on the rake face of the cutting tool is W(rake)>1.5 N/μm.

8. The cutting tool of claim 1, wherein the residual stress as measured in the surface area on the rake face of the cutting tool is compressive and >1500 MPa, wherein the stress measurement is made with X-ray diffraction and the $\sin^2\psi$-method using (2 1 1) reflection of WC.

9. The cutting tool of claim 1, wherein the cemented carbide comprises 2.5-7 wt % Ni, 0.5-3 wt % Fe, 0.1-0.5 wt % Co and balance WC.

10. The cutting tool of claim 1, wherein the cemented carbide comprises one or more of Ti, Nb, Ta, Mo, Re, Ru, Cr, Zr, V, N— and balance WC.

11. The cutting tool of claim 1, wherein an edge rounding, ER, of at least a part of said cutting edge is between 10 μm and 50 μm.

12. The cutting tool of claim 10, wherein the cemented carbide comprises 5-7 wt % Ni, 0.5-1.5 wt % Fe, 0.2-0.4 wt % Co and one or more of Ti, Nb, Ta, Mo, Re, Ru, Cr, Zr, V, N, and balance WC.

13. The cutting tool of claim 10, wherein the cemented carbide comprises 1.5-2.5 wt % Ti, 0.25-0.75 wt % Nb, 2.5-3.5 wt % Ta, 0.05-0.2 wt % N, 5-7 wt % Ni, 0.5-1.5 wt % Fe, 0.2-0.4 wt % Co and balance WC.

14. A cutting tool comprising:
a substrate of cemented carbide, said cemented carbide including hard constituents in a metallic binder, the hard constituents including WC and the WC content in the cemented carbide being 80-96 wt %, and wherein the cemented carbide has a Ni content of 2.5-7 wt % and a weight ratio of Fe/Ni<1.5 and a weight ratio of Co/Ni<0.825; and
a rake face, a flank face and a cutting edge there between, wherein the hardness H, is measured with Vickers indentation made with a load of 100*9.81 N, wherein the crack resistance W is defined as $$W = \frac{P}{4\bar{a}}$$

wherein P is the load of a Vickers hardness indentation and $\bar{a}$ is the average crack length of each crack formed at the corners of the Vickers hardness indentation, and wherein the product of the hardness at the rake face H(rake) and the crack resistance at the rake face W(rake) is H(rake)*W(rake)>3000 HV100*N/μm, wherein the W as measured on the bulk area of the cutting tool is W(bulk) and wherein W(rake)/W(bulk)>2, and wherein the cemented carbide comprises
i) 2.5-7 wt % Ni, 0.5-3 wt % Fe, 0.1-0.5 wt % Co and balance WC; and optionally
ii) one or more of Ti, Nb, Ta, Mo, Re, Ru, Cr, Zr, V, and N.

15. A method of producing the cutting tool of claim 1 comprising the cemented carbide substrate, said cemented carbide including hard constituents in the metallic binder, the hard constituents including WC and wherein the WC content in the cemented carbide is 80-96 wt % and wherein the cemented carbide has the Ni content of 2.5-13 wt % and a weight ratio of Fe/Ni<1.5 and the weight ratio of Co/Ni<0.825, wherein the cutting tool includes the rake face, the flank face and the cutting edge there between, and wherein said shot peening is performed at least on the rake face, the method comprising a step of:

shot peening the rake face of the cutting tool, wherein the shot peening is performed at a temperature of 100-600° C.

16. The method according to any of claim 15, wherein the shot peening is performed with ceramic beads, the beads 5 having an average diameter of 50-200 μm.

*   *   *   *   *